US012270639B2

(12) United States Patent
Bretl et al.

(10) Patent No.: US 12,270,639 B2
(45) Date of Patent: Apr. 8, 2025

(54) NON-CONTACT VEHICLE ORIENTATION AND ALIGNMENT SENSOR AND METHOD

(71) Applicant: BPG Sales and Technology Investments, LLC, Ada, MI (US)

(72) Inventors: Frank J. Bretl, Corvallis, OR (US); David L. Frederic, Lebanon, OR (US); Patrick C. Pointer, Corvallis, OR (US); Mark A. Trevisiol, Albany, OR (US); Ben Wahlstrom, Austin, TX (US)

(73) Assignee: BPG Sales and Technology Investments, LLC, Shelby Township, MI (US)

( * ) Notice: Subject to any disclaimer, the term of this patent is extended or adjusted under 35 U.S.C. 154(b) by 1017 days.

(21) Appl. No.: 17/241,653

(22) Filed: Apr. 27, 2021

(65) Prior Publication Data

US 2021/0333097 A1    Oct. 28, 2021

Related U.S. Application Data

(60) Provisional application No. 63/016,064, filed on Apr. 27, 2020.

(51) Int. Cl.
*G01B 11/27* (2006.01)
*G01B 11/25* (2006.01)
*G01B 11/275* (2006.01)

(52) U.S. Cl.
CPC ...... *G01B 11/2755* (2013.01); *G01B 11/2513* (2013.01); *G01B 2210/14* (2013.01); *G01B 2210/26* (2013.01); *G01B 2210/286* (2013.01)

(58) Field of Classification Search
None
See application file for complete search history.

(56) References Cited

U.S. PATENT DOCUMENTS 3,288,020 A   11/1966   Lill
3,630,623 A   12/1971   Schirmer et al.
(Continued)

FOREIGN PATENT DOCUMENTS

CN    1764818 A    4/2006
CN    100373129    3/2008
(Continued)

OTHER PUBLICATIONS

Durr AG: Adjustment of Driver Assistance Systems (DAS) for Commercial Vehicles, video at https://www.youtube.com/watch?v=7wdgc-RsewQ, Posted Jul. 31, 2015.
(Continued)

*Primary Examiner* — Hovhannes Baghdasaryan
(74) *Attorney, Agent, or Firm* — Gardner, Linn, Burkhart & Ondersma LLP

(57) ABSTRACT

A non-contact sensor for determining orientation of an object, such as a tire and wheel assembly of a vehicle, includes a projector assembly having a light emitter, a lens assembly and a mask, with the mask including mask apertures and the light emitter configured to project light through the lens assembly and mask apertures and onto the object, and with the mask apertures creating a light pattern of projected light onto the object. The sensor also includes an imager configured to image reflections of the light pattern from the object, and a processor. The projector assembly and imager are angled with respect to one another, and the processor is configured to process imaged reflections of the light pattern to derive the orientation of the object, such as the alignment orientation of the tire and wheel assembly.

20 Claims, 12 Drawing Sheets

(56) References Cited

U.S. PATENT DOCUMENTS

| | | | |
|---|---|---|---|
| 3,918,816 A | 11/1975 | Foster et al. |
| 4,249,824 A | 2/1981 | Wiederrich et al. |
| 4,303,338 A | 12/1981 | Morrison et al. |
| 4,337,581 A | 7/1982 | Eck |
| 4,416,065 A | 11/1983 | Hunter |
| 4,444,496 A | 4/1984 | Dale, Jr. |
| 4,639,878 A | 1/1987 | Day et al. |
| 4,647,208 A | 3/1987 | Bieman |
| 4,690,557 A | 9/1987 | Wiklund |
| 4,724,480 A | 2/1988 | Hecker et al. |
| 4,726,122 A | 2/1988 | Andersson |
| 4,863,266 A | 9/1989 | Masuko et al. |
| RE33,144 E | 1/1990 | Hunter et al. |
| 4,899,218 A | 2/1990 | Waldecker et al. |
| 4,931,964 A | 6/1990 | Titsworth et al. |
| 5,018,853 A | 5/1991 | Hechel et al. |
| 5,044,746 A | 9/1991 | Henseli |
| 5,048,954 A | 9/1991 | Madey et al. |
| 5,054,918 A | 10/1991 | Downing et al. |
| 5,140,533 A | 8/1992 | Celette |
| 5,177,558 A | 1/1993 | Hill |
| 5,177,563 A | 1/1993 | Everett et al. |
| 5,198,877 A | 3/1993 | Schulz |
| 5,249,364 A | 10/1993 | Bishop |
| 5,259,246 A | 11/1993 | Stuyts |
| 5,268,731 A | 12/1993 | Fuchiwaki et al. |
| 5,274,433 A | 12/1993 | Madey et al. |
| 5,291,264 A | 3/1994 | Longa et al. |
| 5,489,983 A | 2/1996 | McClenahan et al. |
| 5,519,489 A | 5/1996 | McClenahan et al. |
| 5,532,816 A | 7/1996 | Spann et al. |
| 5,559,695 A | 9/1996 | Daily |
| 5,583,797 A | 12/1996 | Fluegge et al. |
| 5,600,893 A | 2/1997 | Phillips |
| 5,675,408 A | 10/1997 | Samuelsson et al. |
| 5,703,796 A | 12/1997 | Moradi et al. |
| 5,724,129 A | 3/1998 | Matteucci |
| 5,724,743 A | 3/1998 | Jackson |
| 5,731,870 A | 3/1998 | Bartko et al. |
| 5,760,938 A | 6/1998 | Hodge |
| 5,767,382 A | 6/1998 | Buchanan |
| 5,781,286 A | 7/1998 | Knestel |
| 5,812,256 A | 9/1998 | Chapin et al. |
| 5,815,257 A | 9/1998 | Haas |
| 5,818,574 A | 10/1998 | Jones et al. |
| 5,870,315 A | 2/1999 | January |
| 5,930,881 A | 8/1999 | Naruse et al. |
| 5,978,077 A | 11/1999 | Koerner et al. |
| 6,078,846 A | 6/2000 | Greer et al. |
| 6,100,923 A | 8/2000 | Sass et al. |
| 6,115,927 A | 9/2000 | Hendrix |
| 6,148,528 A | 11/2000 | Jackson |
| 6,161,419 A | 12/2000 | Langlechner |
| 6,226,879 B1 | 5/2001 | Baird |
| 6,285,959 B1 | 9/2001 | Greer |
| 6,363,619 B1 | 4/2002 | Schirmer et al. |
| 6,397,164 B1 | 5/2002 | Nobis et al. |
| 6,400,451 B1 | 6/2002 | Fukuda et al. |
| 6,404,486 B1 | 6/2002 | Nobis et al. |
| 6,412,183 B1 | 7/2002 | Uno |
| 6,424,411 B1 | 7/2002 | Rapidel et al. |
| 6,456,372 B1 | 9/2002 | Hudy |
| 6,473,978 B1 | 11/2002 | Maas |
| 6,483,577 B2 | 11/2002 | Stieff |
| 6,522,400 B1 | 2/2003 | Horn |
| 6,532,673 B2 | 3/2003 | Jahn et al. |
| 6,542,840 B2 | 4/2003 | Okamoto et al. |
| 6,545,750 B2 | 4/2003 | Roth et al. |
| 6,559,936 B1 | 5/2003 | Colombo et al. |
| 6,640,612 B2 | 11/2003 | Corghi |
| 6,657,711 B1 | 12/2003 | Kitagawa et al. |
| 6,658,749 B2 | 12/2003 | Jackson et al. |
| 6,658,751 B2 | 12/2003 | Jackson et al. |
| 6,690,456 B2 | 2/2004 | Bux et al. |
| 6,691,062 B1 | 2/2004 | Nobis |
| 6,707,557 B2 | 3/2004 | Young, Jr. et al. |
| 6,710,866 B1 | 3/2004 | Adolph |
| 6,714,291 B2 | 3/2004 | Castagnoli et al. |
| 6,731,382 B2 | 5/2004 | Jackson et al. |
| 6,744,497 B2 | 6/2004 | Burns, Jr. |
| 6,748,796 B1 | 6/2004 | Van Den Bossche |
| 6,765,664 B2 | 7/2004 | Groothuis et al. |
| 6,766,229 B2 | 7/2004 | Dry et al. |
| 6,796,035 B2 | 9/2004 | Jahn et al. |
| 6,796,043 B2 | 9/2004 | Jackson et al. |
| 6,802,130 B2 | 10/2004 | Podbielski et al. |
| 6,813,015 B2 | 11/2004 | Knoedler et al. |
| 6,823,598 B1 | 11/2004 | Loescher |
| 6,823,601 B2 | 11/2004 | Murray |
| 6,829,046 B1 | 12/2004 | Groothuis et al. |
| 6,836,970 B2 | 1/2005 | Hirano |
| 6,839,972 B2 | 1/2005 | Jackson et al. |
| 6,842,238 B2 | 1/2005 | Corghi |
| 6,879,403 B2 | 4/2005 | Freifeld |
| 6,912,477 B2 | 6/2005 | Murray |
| 6,915,228 B2 | 7/2005 | Uffenkamp et al. |
| 6,931,340 B2 | 8/2005 | Jackson et al. |
| 6,959,253 B2 | 10/2005 | Jackson et al. |
| 6,968,282 B1 | 11/2005 | Jackson et al. |
| 7,065,462 B2 | 1/2006 | Merrill et al. |
| 7,062,861 B2 | 6/2006 | O'Mahony et al. |
| 7,075,635 B2 | 7/2006 | Groothuis et al. |
| 7,121,011 B2 | 10/2006 | Murray et al. |
| 7,230,694 B2 | 6/2007 | Forster et al. |
| 7,265,821 B1 | 9/2007 | Lawrence et al. |
| 7,331,211 B2 | 2/2008 | Harrill |
| 7,337,650 B1 | 3/2008 | Preston et al. |
| 7,352,455 B2 | 4/2008 | Groothuis et al. |
| 7,380,344 B2 | 6/2008 | Dietrich |
| 7,382,913 B2 | 6/2008 | Dorranc et al. |
| 7,424,387 B1 | 9/2008 | Gill et al. |
| 7,501,980 B2 | 3/2009 | Focke et al. |
| 7,535,558 B2 | 5/2009 | Uffenkamp et al. |
| 7,570,352 B2 | 8/2009 | Flannigan et al. |
| 7,778,748 B2 | 8/2010 | Probst et al. |
| 7,779,544 B2 | 8/2010 | Tentrup et al. |
| 7,860,295 B2 | 12/2010 | Donner et al. |
| 7,864,309 B2 | 1/2011 | De Sloovere et al. |
| 7,907,265 B2 | 3/2011 | Tentrup et al. |
| 7,908,751 B2 | 3/2011 | Nobis et al. |
| 7,974,806 B1 | 7/2011 | Burns et al. |
| 8,096,057 B2 | 1/2012 | Schommer et al. |
| 8,107,062 B2 | 1/2012 | De Sloovere et al. |
| 8,127,599 B2 | 3/2012 | Schommer et al. |
| 8,131,017 B2 | 3/2012 | Bux et al. |
| 8,135,514 B2 | 3/2012 | Kelly et al. |
| 8,150,144 B2 | 4/2012 | Nobis et al. |
| 8,196,461 B2 | 6/2012 | Abraham et al. |
| 8,244,024 B2 | 8/2012 | Dorrance et al. |
| 8,254,666 B2 | 8/2012 | Uffenkamp et al. |
| 8,274,648 B2 | 9/2012 | Corghi |
| 8,363,979 B2 | 1/2013 | Abraham et al. |
| 8,400,624 B2 | 3/2013 | De Sloovere et al. |
| 8,418,543 B2 | 4/2013 | Tentrup et al. |
| 8,448,342 B2 | 5/2013 | Nobis et al. |
| 8,452,552 B2 | 5/2013 | Nobis et al. |
| 8,457,925 B1 | 6/2013 | Stieff et al. |
| 8,489,353 B2 | 7/2013 | Raphael |
| 8,492,701 B2 | 7/2013 | Nobis et al. |
| 8,522,609 B2 | 9/2013 | Nobis et al. |
| 8,538,724 B2 | 9/2013 | Corghi |
| 8,578,765 B2 | 11/2013 | Nobis et al. |
| 8,638,452 B2 | 1/2014 | Muhle et al. |
| 8,650,766 B2 | 2/2014 | Nobis et al. |
| 8,836,764 B2 | 9/2014 | Gruetzmann et al. |
| 8,854,454 B2 | 10/2014 | Abraham et al. |
| 8,918,302 B2 | 12/2014 | Hukkeri et al. |
| 9,001,189 B2 | 4/2015 | Nobis et al. |
| 9,127,937 B2 | 9/2015 | Nobis et al. |
| 9,134,120 B2 | 9/2015 | Schommer et al. |
| 9,170,101 B2 | 10/2015 | Steiff |
| 9,182,477 B2 | 11/2015 | Jones et al. |
| 9,212,907 B2 | 12/2015 | D'Agostino et al. |
| 9,279,670 B2 | 3/2016 | Schommer et al. |

(56) References Cited

U.S. PATENT DOCUMENTS

| | | | |
|---|---|---|---|
| 9,279,882 B2 | 3/2016 | Hukkeri et al. |
| 9,377,379 B2 | 6/2016 | Lee |
| 9,448,138 B2 | 9/2016 | Stieff et al. |
| 9,539,866 B2 | 1/2017 | Mouchet |
| 9,545,966 B2 | 1/2017 | Kim |
| 9,581,524 B2 | 2/2017 | Liu |
| 9,645,051 B2 | 5/2017 | Jin |
| 9,658,062 B2 | 5/2017 | Duff et al. |
| 9,677,974 B2 | 6/2017 | Lee |
| 9,779,560 B1 | 10/2017 | Dorrance et al. |
| 9,779,561 B1 | 10/2017 | Dorrance et al. |
| 9,791,268 B2 | 10/2017 | Buzzi et al. |
| 10,001,429 B2 | 6/2018 | Krueger et al. |
| 10,068,389 B1 | 9/2018 | Strege et al. |
| 10,139,213 B2 | 11/2018 | Herrmann et al. |
| 10,222,455 B1 | 3/2019 | Stieff et al. |
| 10,240,916 B2 | 3/2019 | Golab et al. |
| 10,241,195 B1 | 3/2019 | Stieff et al. |
| 10,284,777 B2 | 5/2019 | Rogers et al. |
| 10,298,814 B2 | 5/2019 | Harrell et al. |
| 10,347,006 B2 | 7/2019 | Kunert et al. |
| 10,365,095 B2 | 7/2019 | D'Agostino et al. |
| 10,436,885 B2 | 10/2019 | Wheeler |
| 10,444,010 B2 | 10/2019 | Strege et al. |
| 10,475,201 B1 | 11/2019 | Hall et al. |
| 10,514,323 B2 | 12/2019 | Corghi |
| 10,567,650 B2 | 2/2020 | Rogers et al. |
| 10,634,488 B2 | 4/2020 | Stieff et al. |
| 10,670,392 B2 | 6/2020 | Rogers et al. |
| 10,684,125 B2 | 6/2020 | D'Agostino et al. |
| 10,692,241 B2 | 6/2020 | Kunert et al. |
| 10,692,308 B2 | 6/2020 | Cho et al. |
| 10,697,766 B1 | 6/2020 | Dorrance et al. |
| 10,788,400 B2 | 9/2020 | Stieff et al. |
| 10,848,316 B1 | 11/2020 | Stieff et al. |
| 10,871,368 B2 | 12/2020 | Krueger |
| 11,061,120 B2 | 7/2021 | Castorena Martinez et al. |
| 11,243,074 B2 | 2/2022 | DeBoer et al. |
| 2002/0020071 A1 | 2/2002 | Jackson et al. |
| 2002/0099483 A1 | 7/2002 | Jackson et al. |
| 2004/0049930 A1 | 3/2004 | Murray |
| 2005/0022587 A1 | 2/2005 | Trentrup et al. |
| 2005/0096807 A1 | 5/2005 | Murray et al. |
| 2006/0090356 A1 | 5/2006 | Stieff |
| 2006/0274303 A1 | 12/2006 | Jackson et al. |
| 2006/0279728 A1 | 12/2006 | Dorrance et al. |
| 2008/0007722 A1 | 1/2008 | Golab et al. |
| 2008/0148581 A1 | 6/2008 | Boni et al. |
| 2008/0186514 A1 | 8/2008 | Uffenkamp et al. |
| 2009/0046279 A1 | 2/2009 | Tentrup et al. |
| 2010/0060885 A1 | 3/2010 | Nobis et al. |
| 2010/0238291 A1 | 9/2010 | Pavlov et al. |
| 2010/0321674 A1 | 12/2010 | Corghi |
| 2011/0077900 A1 | 3/2011 | Corghi |
| 2011/0271749 A1 | 11/2011 | Tentrup et al. |
| 2012/0092654 A1* | 4/2012 | De Sloovere ......... G01B 11/25 356/139.09 |
| 2013/0110314 A1 | 5/2013 | Stieff |
| 2013/0188020 A1 | 7/2013 | Seifert et al. |
| 2013/0325252 A1 | 12/2013 | Schommer et al. |
| 2014/0129076 A1 | 5/2014 | Mouchet et al. |
| 2014/0253908 A1 | 9/2014 | Lee |
| 2014/0253909 A1 | 9/2014 | McClenahan et al. |
| 2014/0278226 A1 | 9/2014 | Stieff et al. |
| 2015/0049188 A1 | 2/2015 | Harrell et al. |
| 2015/0049199 A1 | 2/2015 | Rogers et al. |
| 2015/0103358 A1* | 4/2015 | Flascher ............ G01B 11/2513 356/603 |
| 2015/0134191 A1 | 5/2015 | Kim |
| 2016/0334209 A1 | 11/2016 | Linson |
| 2017/0003141 A1 | 1/2017 | Voeller et al. |
| 2017/0097229 A1 | 4/2017 | Rogers et al. |
| 2018/0052223 A1 | 2/2018 | Stieff et al. |
| 2018/0060036 A1 | 3/2018 | Frisch et al. |
| 2018/0075675 A1 | 3/2018 | Kim |
| 2018/0094922 A1 | 4/2018 | Oki et al. |
| 2018/0100783 A1 | 4/2018 | Stieff et al. |
| 2018/0134529 A1 | 5/2018 | Zecher et al. |
| 2018/0188022 A1 | 7/2018 | Leikert |
| 2018/0259424 A1 | 9/2018 | Tentrup |
| 2018/0276910 A1 | 9/2018 | Pitt et al. |
| 2018/0299533 A1 | 10/2018 | Pliefke et al. |
| 2019/0204184 A1 | 7/2019 | Neumann et al. |
| 2019/0222723 A1 | 7/2019 | Harrell et al. |
| 2019/0249985 A1 | 8/2019 | Stieff et al. |
| 2019/0279395 A1 | 9/2019 | Kunert et al. |
| 2019/0331482 A1 | 10/2019 | Lawrence et al. |
| 2020/0074675 A1 | 3/2020 | Cejka |
| 2020/0088515 A1 | 3/2020 | Rogers et al. |
| 2020/0117210 A1 | 4/2020 | Ren et al. |
| 2020/0130188 A1 | 4/2020 | Lawrence et al. |
| 2020/0141724 A1 | 5/2020 | Lawrence et al. |
| 2020/0273206 A1 | 8/2020 | Corghi |
| 2020/0309517 A1 | 10/2020 | D'Agostino et al. |
| 2020/0320739 A1 | 10/2020 | Kunert et al. |
| 2021/0387637 A1 | 12/2021 | Rogers |
| 2022/0018935 A1 | 1/2022 | Jefferies et al. |
| 2022/0234596 A1 | 7/2022 | Jefferies et al. |

FOREIGN PATENT DOCUMENTS

| | | |
|---|---|---|
| CN | 107856649 A | 3/2018 |
| DE | 2948573 A1 | 6/1981 |
| DE | 19857871 C1 | 10/2000 |
| DE | 102009009046 A1 | 10/2009 |
| DE | 1020090152074 A1 | 10/2010 |
| EP | 0593066 A1 | 4/1994 |
| EP | 0593067 A1 | 4/1994 |
| EP | 0679865 A1 | 11/1995 |
| EP | 0766064 A2 | 4/1997 |
| EP | 0994329 A1 | 4/2000 |
| EP | 1221584 A1 | 7/2002 |
| EP | 1260832 A1 | 11/2002 |
| EP | 1505363 A1 | 2/2005 |
| EP | 0946857 B1 | 7/2005 |
| EP | 0943890 B1 | 2/2007 |
| EP | 1376051 B1 | 1/2008 |
| EP | 1295087 B1 | 8/2010 |
| EP | 2302318 A1 | 3/2011 |
| EP | 1818748 B1 | 5/2014 |
| EP | 3084348 B1 | 3/2017 |
| EP | 3036516 B1 | 4/2018 |
| EP | 3608687 A1 | 2/2020 |
| EP | 3228976 B1 | 11/2020 |
| FR | 2808082 A1 | 10/2001 |
| JP | 2005055389 A | 3/2005 |
| JP | 4530604 B2 | 8/2010 |
| JP | 2019529918 A | 10/2019 |
| KR | 20070016095 A | 2/2007 |
| KR | 20100017607 A | 2/2010 |
| KR | 100948886 B1 | 3/2010 |
| KR | 101510336 B1 | 4/2015 |
| KR | 20150105766 A | 9/2015 |
| KR | 20160137313 A | 11/2016 |
| KR | 101729619 B1 | 4/2017 |
| KR | 20190019403 A | 2/2019 |
| WO | 9515479 A1 | 6/1995 |
| WO | 0071972 A1 | 11/2000 |
| WO | 0231437 A1 | 4/2002 |
| WO | 2008014783 A1 | 2/2008 |
| WO | 2008086773 A1 | 7/2008 |
| WO | 2008130385 A1 | 10/2008 |
| WO | 2010138543 A1 | 12/2010 |
| WO | 2013079395 A1 | 6/2013 |
| WO | 2015092594 A2 | 6/2015 |
| WO | 2017016541 A1 | 2/2017 |
| WO | 2018035040 A1 | 2/2018 |
| WO | 2018067354 A1 | 4/2018 |
| WO | 2018153723 A1 | 8/2018 |
| WO | 2018158073 A1 | 9/2018 |
| WO | 2018167809 A1 | 9/2018 |
| WO | 2018188931 A1 | 10/2018 |

(56) References Cited

FOREIGN PATENT DOCUMENTS

WO        2020056303   A1     3/2020
WO        2021005578   A1     1/2021

OTHER PUBLICATIONS

Mahle Aftermarket Italy S.P.A., TechPRO Digital ADAS, 4 p. Apr. 2019, Parma, Italy.
International Search Report and Written Opinion from International Application No. PCT/US08/62424 completed on Aug. 4, 2008.
ISRA Vision Systems Press Release, No. 97, May 16, 2006 "Mounting Wheels Automatically on Moving Car Bodies".
Dürr Factory Assembly Systems (FAS) materials, Dr. Thomas Tentrup, believed to be dated Sep. 2006, with partial translation of pp. 12-14.
European Search Report from European Application No. 08747507, completed on Mar. 17, 2010.
International Search Report and Written Opinion of the International Searching Authority from corresponding Patent Cooperation Treaty (PCT) Application No. PCT/IB2021/053485, indicated completed on Jul. 23, 2021.

\* cited by examiner

NON-CONTACT VEHICLE ORIENTATION AND ALIGNMENT SENSOR AND METHOD

CROSS REFERENCE TO RELATED APPLICATION

The present application claims priority of U.S. provisional application Ser. No. 63/016,064, filed on Apr. 27, 2020, which is hereby incorporated by reference in its entirety.

BACKGROUND AND FIELD OF THE INVENTION

The present invention is directed to a measurement apparatus and method for determining the orientation of a three-dimensional object with respect to a reference system, and in particular to a measurement system comprising one or more sensors for use with vehicles to determine the orientation of tire and wheel assemblies and/or other components of the vehicle by projecting light beams onto the vehicle and analyzing reflected images for determining the orientation, such as with respect to a predetermined orientation.

In the automotive industry, proper vehicle quality requires measurement and adjustment of wheel alignment settings, both during manufacture and subsequently during the useful life of the vehicle. Proper positioning and alignment of vehicle wheels, and especially steerable wheels such as the front wheels of a vehicle, requires the setting of toe, camber angle, and caster angle. Toe is the angle between the vehicle's longitudinal axis and a plane through the center of the wheel/tire and affects the straight-ahead running of the vehicle as well as steering. Camber angle is the inclination of the wheel axis toward the road surface in a vertical plane and is negative when the top of the wheel is inclined toward the center of the vehicle. Caster angle is the tilt of the steering axis parallel to the direction of the vehicle centerline. A tilt toward the rear of the vehicle results in a positive caster angle. During assembly and/or repair of vehicles, it is important to measure, adjust or audit, and set the toe as well as the camber and caster angles of vehicle wheels, and especially steerable wheels, so the vehicle will drive and steer properly.

In addition to the orientation of the wheel assemblies, it is often necessary to measure the ride or fender height of the vehicle, including for vehicle alignment purposes as well as for maintaining the proper vehicle orientation for sensors disposed about the vehicle. This includes cameras and other Advanced Driver Assistance System (ADAS) sensors of the vehicle.

SUMMARY OF THE INVENTION

The present invention provides a non-contact vehicle sensor for determining the orientation or position of an object, such as the alignment orientation of a tire and wheel assembly and/or for determining the position or orientation of other features of the vehicle, such as the fender height.

According to an aspect of the present invention, a non-contact sensor for determining orientation of an object includes a projector assembly, an imager and at least one processor. The projector assembly includes a light emitter, a lens assembly and a mask, with the mask including mask apertures and the light emitter configured to project light through the lens assembly and mask apertures and onto an object, and with the mask apertures creating a light pattern of projected light onto the object. The imager is configured to image reflections of the light pattern from the object, and the projector assembly and imager are angled with respect to one another. The processor is configured to process imaged reflections of the light pattern to derive the orientation of the object, such as the alignment orientation of a vehicle tire and wheel assembly.

In particular embodiments the light emitter is configured as an LED light emitter. Moreover, the lens assembly includes a pair of adjacently disposed lenses positioned between the light emitter and the mask, where the pair of adjacently disposed lenses may be first and second hemispherical lenses. The lens assembly further includes a focus lens that is spaced from the mask whereby light projected through the mask is projected through the focus lens and onto an object.

The light pattern includes a visual identifier that is used by the processor to discern the identity and location of the light pattern when projected on the object. In a particular embodiment, the visual identifier comprises a gap between a pair of parallel illumination lines generated by the light pattern on the object. The mask, therefore, may include multiple slits, such as multiple parallel slits, whereby the light pattern of projected light forms illumination lines on the object. In accordance with a particular embodiment of the invention, the slits may be horizontally oriented with selected ones of the slits spaced equidistant from each other and with two of the slits being spaced closer to each other to form the visual identifier to enable the processor to discern the identity and location of each projected illumination line based on the visual identifier.

The non-contact sensor may employ or utilize multiple processors, including a processor configured to process images of the light pattern reflected from the object, and another processor configured to derive the orientation of the object. In a particular embodiment the imager is oriented to view at an angle relative to a horizontal plane, such as with the imager positioned vertically higher than the projector assembly, the imager is downwardly oriented to view at a downward angle.

In a particular embodiment the lens assembly comprises an internal lens and an outer lens with the mask disposed between the internal lens and the outer lens. The projector assembly further includes a projector housing having a threaded bore within which the internal lens is fixed, with the outer lens comprising a focus lens having a threaded end engaged with the threaded bore. The inner lens may further comprise a pair of lenses, such as a pair of hemispherical lenses having their curved portions directed toward each other and flat ends directed away from each other. In such an arrangement, the mask may be mounted against the flat end of the hemispherical lens located adjacent the focus lens.

A non-contact sensor system for determining orientation of a tire and wheel assembly of a vehicle in accordance with the present invention may utilize a pair of non-contact sensors positioned on either side of a tire and wheel assembly of a vehicle. The system may include pairs of non-contact sensors positioned on either side of a tire and wheel assembly on both the front and/or rear wheels. The system may further include a central processor that receives the geometric orientation information from the non-contact sensors to derive the orientation of each of the tire and wheel assemblies.

The present invention, including through the use of an LED light emitter and simplified mask construction in combination with the lens assembly and imager, provides a cost effective design and operation for determining the orientation of an object, such as objects related to a vehicle including tire and wheel assembly orientation and/or fender position. The mask enables a light pattern to be projected, including embodiments in which multiple illumination lines are projected onto an object, such as a tire of a tire and wheel assembly. From the reflected images, the sensors determine three dimensional spatial coordinates of selected points of the illumination lines on the tire and determine a plane through the determined three dimensional spatial coordinates, which plane represents the orientation of the tire and wheel assembly and from which toe and camber may be calculated, as well as other alignment characteristics. The projection of multiple illumination lines provides an increased number of measuring points and, thus, greater precision in determining the tire and wheel assembly orientation, as well as increases the working field over which the sensor may operate. The projection of multiple light planes also enables the projection angle of the light planes or the viewing angle of the illumination lines on the tire and wheel assembly by the sensor to be increased, which in turn enhances the sensitivity of the sensors. Tire and wheel assembly orientation may be calculated for each illumination line imaged by the sensor, thereby providing redundancy, robustness, and enabling noise reduction. Still further, due to the generally torrid shape of tires and the associated determined high points of the illumination lines projected onto the tire sidewall surface, a single image or a dynamic running average of images may be used to calculate camber, toe angle, and wheel center position. These and other objects, advantages, purposes and features of this invention will become apparent upon review of the following specification in conjunction with the drawings.

DESCRIPTION OF THE PREFERRED EMBODIMENTS

Figure 1:
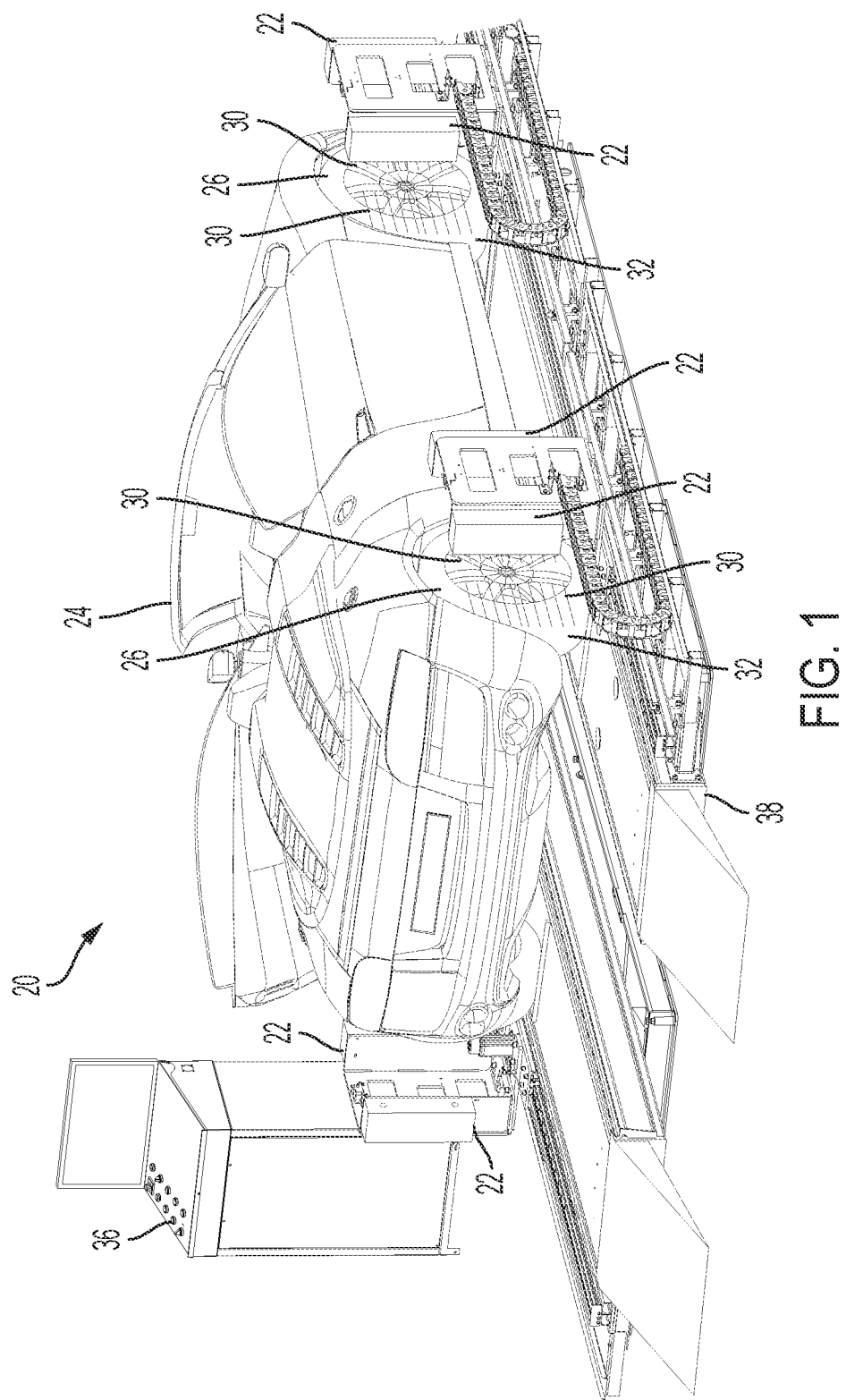
FIG. 1 is a perspective view of a vehicle on a test stand with non-contact vehicle orientation sensors in accordance with the present invention disposed adjacent the wheel assemblies.
Figure 2:
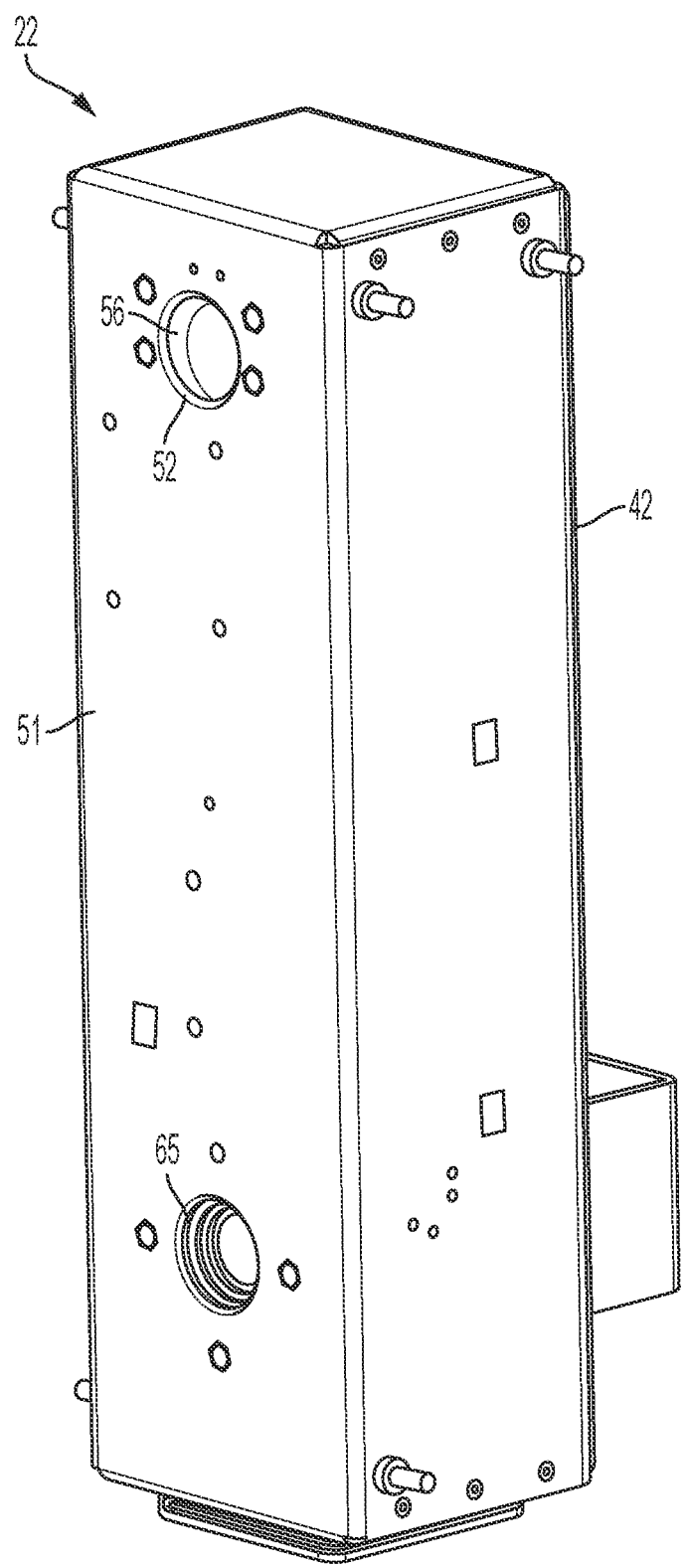
FIG. 2 is a front perspective view of a sensor of FIG. 1 apart from the test stand.

The present invention will now be described with reference to the accompanying figures, wherein the numbered elements in the following written description correspond to like-numbered elements in the figures. A measurement system or apparatus 20 utilizes non-contact vehicle orientation sensors 22, which in the embodiment of FIG. 1 are disposed about the vehicle 24 for determining wheel alignment characteristics of wheel assemblies 26 such as toe, camber, caster, steering axis inclination (SAI), as well as the wheel center, axis of symmetry, and rear thrust angle, where in the illustrated embodiment a pair of sensors 22 are disposed at each wheel assembly 26.

As described in more detail below, each sensor 22 projects light that is formed into multiple light beams to thereby comprise planes of light or light planes 28 (28a-28n FIG. 3) projected at a tire and wheel assembly 26 mounted to vehicle 24 to form or generate multiple generally parallel and horizontal illumination images on the tire sidewall, which are illustrated as illumination lines 30 (FIG. 1) on both the left and right side of the tire 32, with one sensor 22 projecting at the left side of tire 32 and another sensor 22 projecting at the right side of tire 32 (FIG. 1). Each sensor is able to form multiple illumination lines 30 on tire and wheel assembly 26, with sensor 22 additionally imaging the illumination lines 30 as reflections to enable the three dimensional spatial orientation or geometry of the tire and wheel assembly 26 to be calculated throughout the working area of the sensor 22 based on the field of view 34 (FIGS. 3 and 4A) of sensors 22. As also described in more detail below, one or more processors within sensor 22 and/or in computer 36 (FIG. 1), are used to analyze the reflected images received by sensor 22 from within the field of view 34 of sensor 22 and, based on the calibration of sensors 22, such as relative to test stand 38 to which sensors 22 are mounted and calibrated, derive data indicative of the wheel and tire assembly 26 orientation.

The projecting and receiving of multiple light planes 28 enlarges the working volume of sensor 22 with respect to the field of view 34 of sensor 22, as well as provides precision in the determination of wheel alignment characteristics. For example, the projection of multiple illumination lines 30 over the left and right sides of tire 32 provides a large number of measuring points. In addition, the angles made between the projected illumination lines 30 and the field of view 34 of sensor 22 can be kept larger than with other methods that project fewer lines, such as a single line, and the sensitivity is therefore enhanced. Further, the wheel 26 positioning can be calculated for each of the projected illumination lines 30 imaged by the sensor 22, thereby providing redundancy, and consequently robustness and noise reduction. Additionally, when the distance between the wheel 26 and sensor 22 is increased or decreased, such as due to the width of a vehicle, some illumination lines 30 may disappear from the top or bottom of the field of view 34 based on the angled field of view 34, but others enter from the opposite side, thereby keeping functionality over larger depths. That is, the field of view 34 includes a depth of view depending on the position of the wheel assembly 26 relative to the sensor 22.

Figure 3:
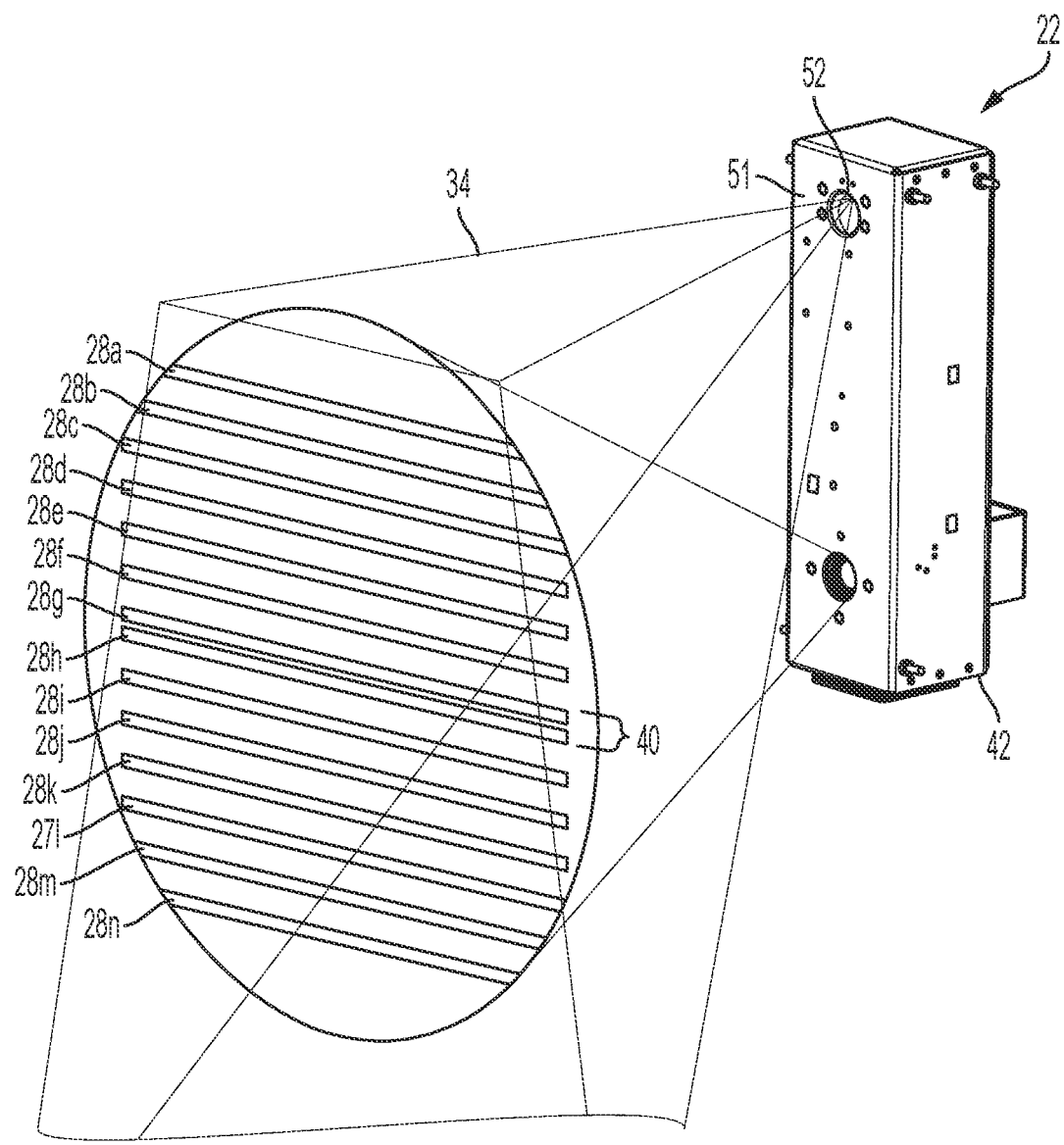
FIG. 3 is a front perspective view of the sensor of FIG. 2 schematically illustrating a projection pattern and field of view of the sensor.
Figure 4A:
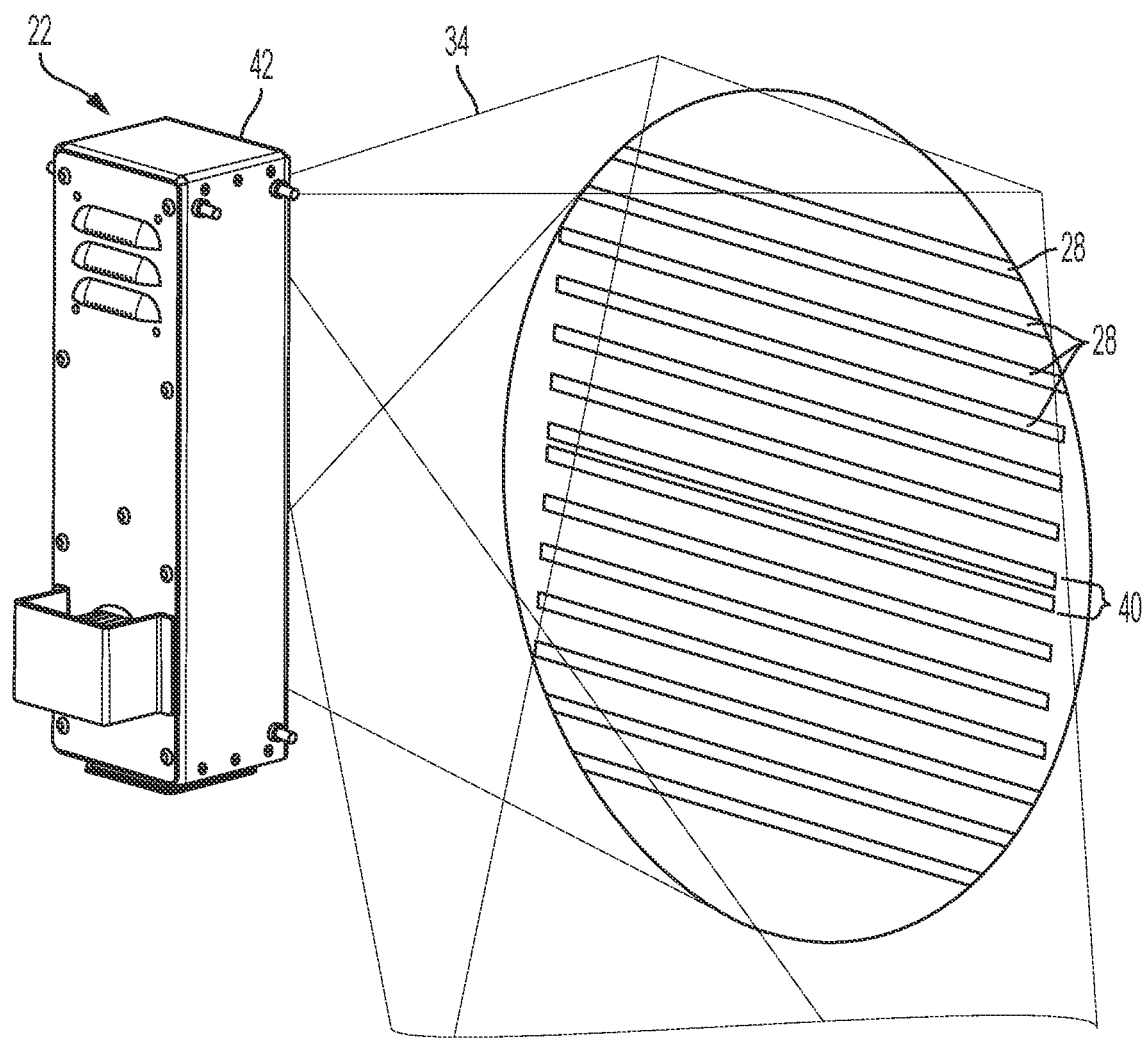
FIG. 4A is a rear perspective view of the sensor of FIG. 2 schematically illustrating the projection pattern and field of view of the sensor.
Figure 4B:
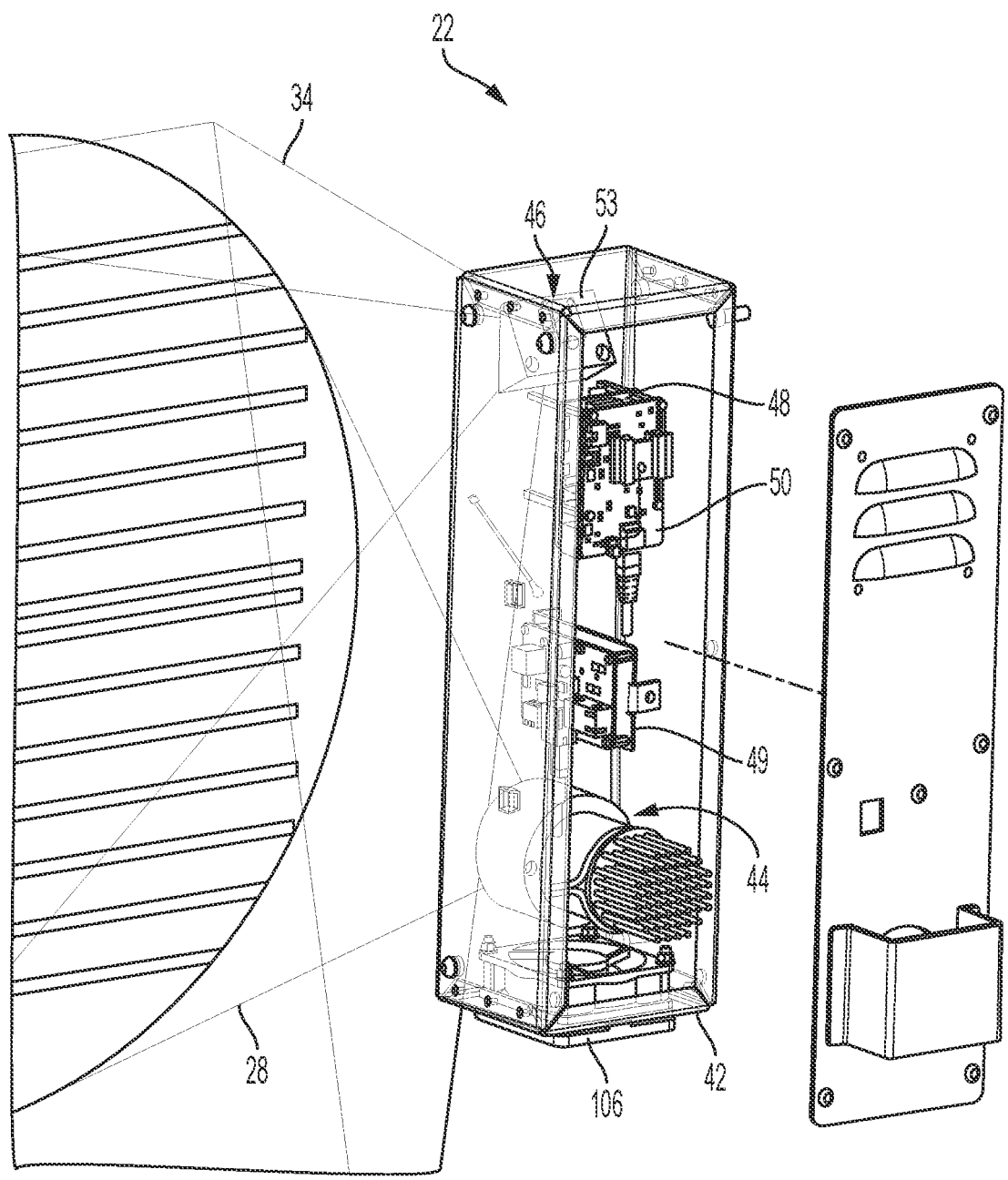
FIG. 4B is an exploded rear perspective view of the sensor of FIG. 2 illustrating an internal arrangement of the sensor.

In the illustrated embodiment, as understood from FIGS. 3 and 4A, light planes 28 are projected whereby two light planes 28g, 28h are spaced in closer proximity to each other than the spacing between light planes 28a-28g relative to each other and the spacing between light planes 28h-28n relative to each other, where light planes 28g and 28h are centrally disposed amongst the light planes 28. As there shown, light planes 28 are parallel to each other, with the spacing between each of light planes 28a-28g being equidistant and the spacing between light planes 28h-28n likewise being equidistant. Accordingly, a different spacing or gap 40 is provided between light planes 28g and 28h, which is narrower in the illustrated embodiment, with gap 40 being used as an identifier or visual identifier by one or more processors of sensor 22 to discern the identity and location of each of the various imaged illumination lines 30 reflected from the tire 32 for use in determining wheel alignment characteristics of wheel assemblies 26. Gap 40 thus provides a visual identifier for the illumination lines 30 formed by the light planes 28. That is, one or more processors of system 20, such as a processor within sensor 22 or a processor of computer 36, utilize the visual identifier of gap 40 in the imaged illumination lines 30 to determine which light planes 28a-n correspond to the detected imaged illumination lines 30. It should be appreciated, however, that alternative visual identifiers may be employed within the scope of the present invention. For example, one or more light planes may be projected other than as a solid line, such as a broken or dashed line, or one or more light planes may be projected to have a different width than other of the projected lines. Still further alternatives for projecting light planes with a visual identifier may be employed to thereby enable sensor 22 to determine the identity and location of particular ones of the reflected illumination lines.

As noted, processors are used to analyze images of the reflected illumination lines 30 received by sensor 22 from within the field of view 34 of sensor 22 and, based on the calibration of sensors 22, derive data indicative of the tire and wheel assembly 26 orientation. Processing to determine the orientation of the tire and wheel assembly 26 may be performed as disclosed in U.S. Pat. No. 7,864,309 to De Sloovere et al. for NON CONTACT WHEEL ALIGNMENT SENSOR AND METHOD, which is incorporated herein by reference in its entirety. For example, in one embodiment, one or more processors derive equations representing imaged illumination lines 30 and correlate selected points of the images to three dimensional spatial values. The selected points for deriving into three dimensional spatial values may be selected as the high points of the illumination lines. Tire sidewalls are naturally bulged such that illumination lines 30 form curves thereon with the high point of such a curved line intended to represent or be located at the physical high point of the tire sidewall along the length of the illumination line 30. The processors may then further determine or fit a plane to the determined high points, with the determined plane being representative of the orientation of the tire and wheel assembly 26, such as for example the toe and camber orientation. Single images or a dynamic running average of images, such as taken while the tire and wheel assembly 26 is rotating, may be used to determine the orientation of the tire and wheel assembly 26.

Alternatively, one or more processors may determine three dimensional spatial coordinates for multiple points along imaged illumination lines 30 within the field of view of sensor 22 and derive a curved line equation for each illumination line 30, such as by fitting curves to the illumination lines 30 based on the three dimensional spatial coordinates for each line. A plane tangential to the determined curved line equations represents the toe and camber orientation of the tire and wheel assembly 26 and intersects with the high points of the illumination lines 30. As such, processors may also determine the three dimensional spatial coordinates of the high points of the viewed illumination lines 30 based on the intersection of the determined tangential plane with the determined curved line equations. As noted, single images or a dynamic running average of images, such as taken while the tire and wheel assembly 26 is rotating, may be used to determine the orientation of the tire and wheel assembly 26.

Pre-established calibration values or sets for the orientation of sensors 22, such as relative to test stand 38, may be used to perform the transfer of curve parameters to three dimensional coordinates. Due to the necessarily concentric orientation of the three dimensional spatial high point coordinates formed by the illumination lines 30, such as on the bulge of a tire 32 sidewall, the determined high points define a circle in three dimensions representative of the tire mounted to the wheel. Processors may then further determine the center of the wheel based on a determination of the center point of the determined circle defined by the three dimensional high points of the illumination lines 30. Based on the determined wheel center point further parameters, such as wheel axle geometry parameters may also then be determined. As understood from FIG. 1, wheel assembly 26 may be positioned on rollers 39 that operate to rotate wheel assembly 26 during measurement. Alternatively, however, measurements may be performed under static conditions of wheel assembly 26, or measurements may be taken as a moving vehicle 24 travels past sensors 22, such as past stationary sensors 22 that are arranged in a fixed orientation.

A discussion of the construction and operation of sensors 22 now follows with reference to FIGS. 2-9. As shown, sensor 22 includes a housing 42 within which is disposed a light projector or projector assembly 44, an imager or imager assembly 46, and circuit board assemblies 48, 49 and 50, where circuit board 48 is configured as an onboard computer, circuit board 49 is a power-over-Ethernet ("POE") board, and circuit board 50 is an LED driver board. In the illustrated embodiment, as understood from FIG. 5, projector assembly 44 is disposed in a lower portion of housing 42 and imager assembly 46 is disposed in an upper portion of housing 42, with imager assembly 46 having an angled orientation so as to have a downward angled FOV. Imager assembly 46 is configured to operate as a camera to image illumination lines 30 that are projected onto the tire 32 via projector assembly 44, with imager assembly 46 having an angled, or non-parallel, FOV relative to the projecting angle of light planes 28 of projector assembly 44. This angling aids in the trigonometric determination of the locations of the illumination lines on a given tire 32. It should be appreciated, however, that alternative arrangements may be employed, including switching the location of the projector assembly 44 and imager assembly 46 within housing 42, and/or angling one of the projector assembly 44 or imager assembly 46 with respect to the other, including to have an upward angled FOV or projection orientation.

Figure 6:
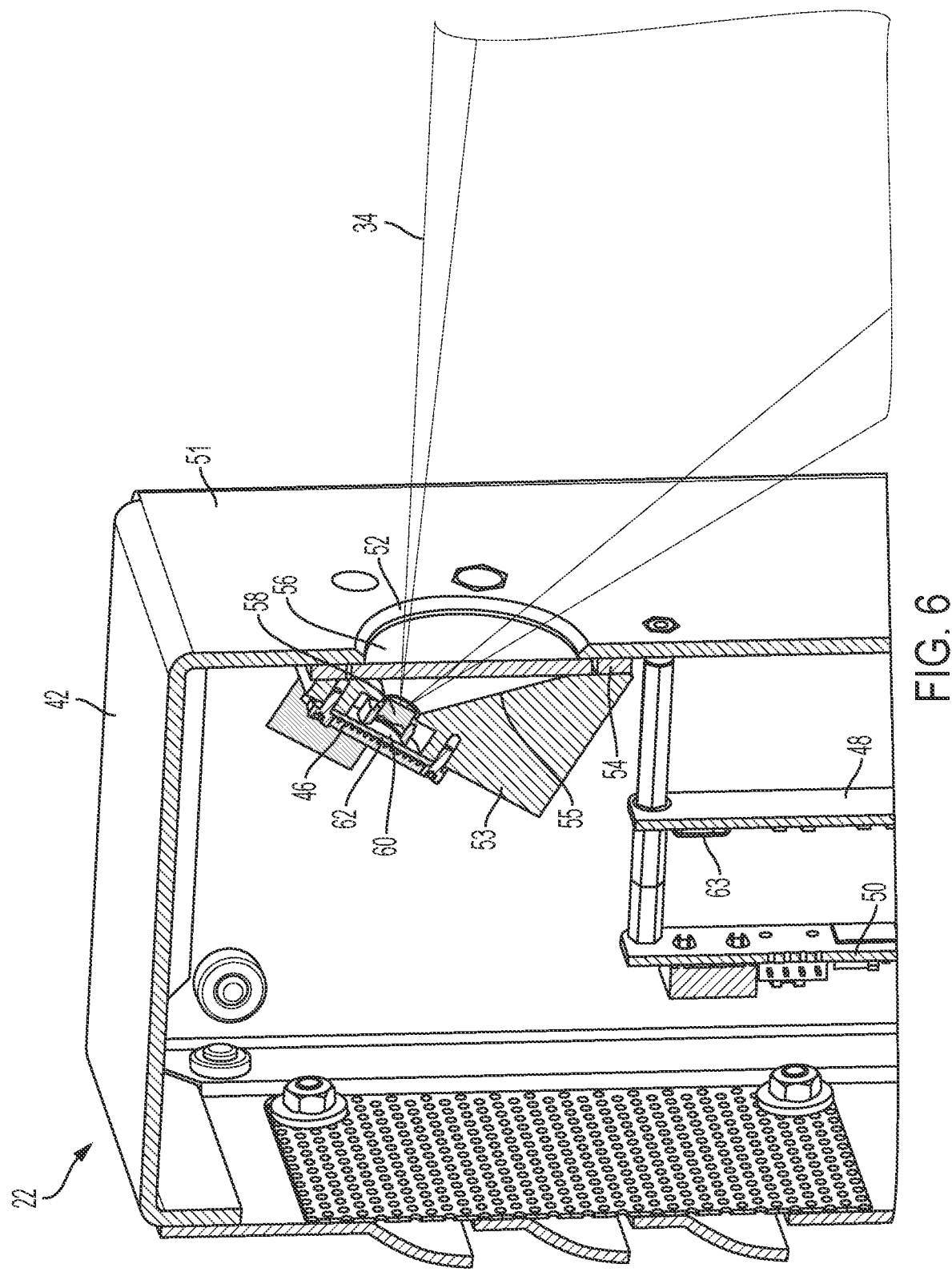
FIG. 6 is a close-up cross sectional perspective view of an upper portion of the sensor of FIG. 2 schematically illustrating the sensor field of view.

With specific reference to FIG. 6, imager assembly 46 is shown mounted within housing 42 at an angle relative to a front panel 51 of housing 42, and in particular at a downward angle so as to view through an aperture 52 on front panel 51. In the illustrated embodiment, imager assembly 46 is secured to a mount or imager housing 53 having a front face 54 and an internal conical cavity 55 that opens on face 54 and is aligned with aperture 52, with mount 53 being affixed to an internal surface of front panel 51 such that cavity 55 is angled relative to vertical. A filter 56 is disposed between the aperture 52 and cavity 55, with filter 56 configured as a red bandpass filter such that only red light is allowed to pass through filter 56 and thereby filter out undesired light noise.

Imager assembly 46 is mounted to a rear face of mount 53 and includes a lens 58 positioned over an image sensor 60, such as a CMOS or CCD sensor, that is integrated with a camera interface board 62. Lens 58 is aligned with cavity 55 and in the illustrated embodiment is mounted at a thirty degree angle relative to vertical. In the illustrated embodiment, the camera interface board 62 receives raw pixel sensor data from the image sensor 60 and converts the data into a format representing the illumination lines 30 for use by the onboard computer circuit board 48, which includes hardware and software, such as may be executable on one or more processor chips 63 thereof. Imager assembly 46 is thus operable to receive reflected images of illumination lines 30 and convert the images into line data for analysis by a subsequent processor, such as a processor 63 on circuit board 48. As further understood from FIG. 6, the FOV 34 is configured by lens 58 and the arrangement of lens 58 with imager sensor 60.

Figure 7:
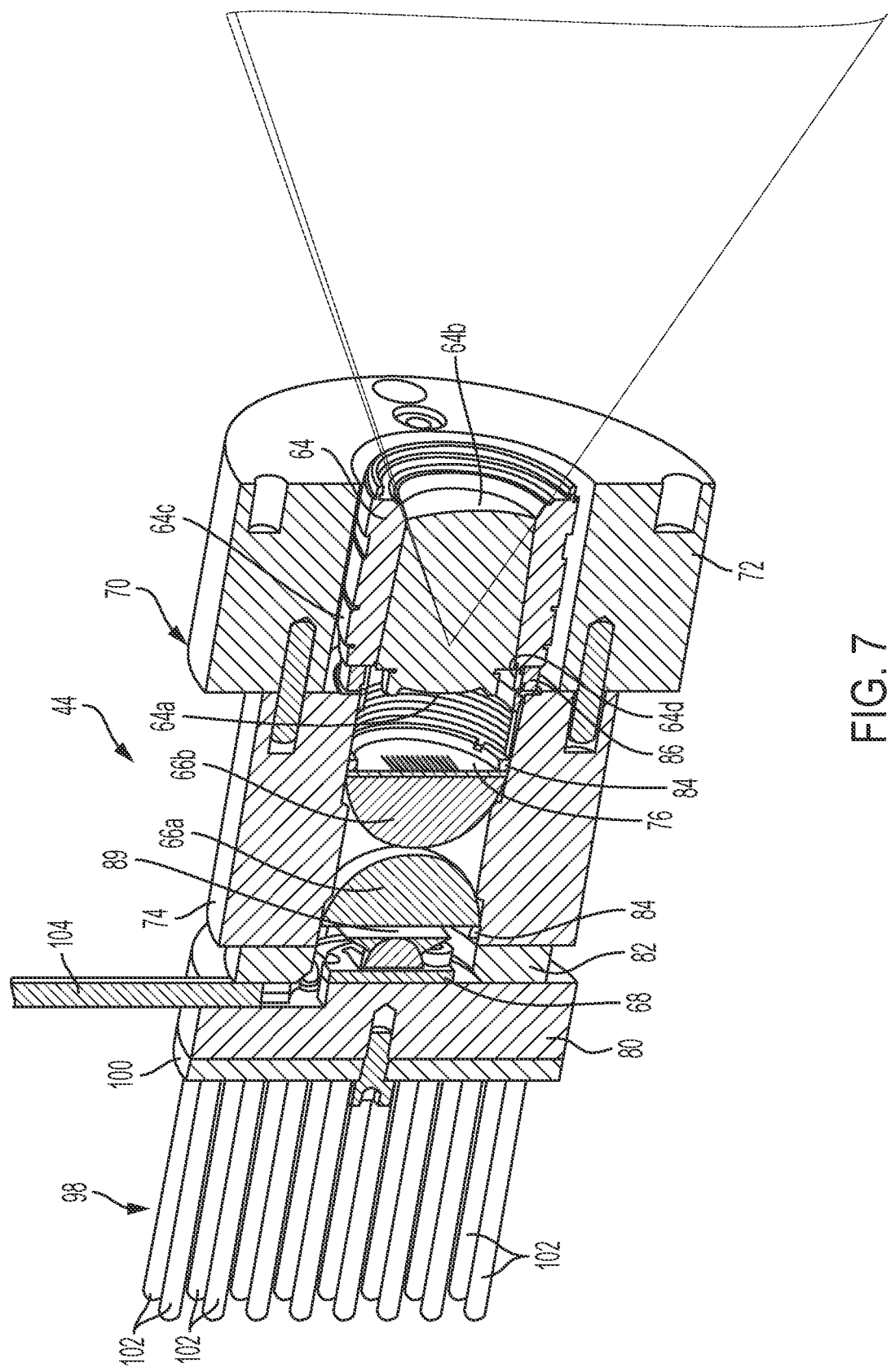
FIG. 7 is a cross sectional perspective view of the projector assembly of the sensor of FIG. 2 removed from the sensor.
Figure 8:
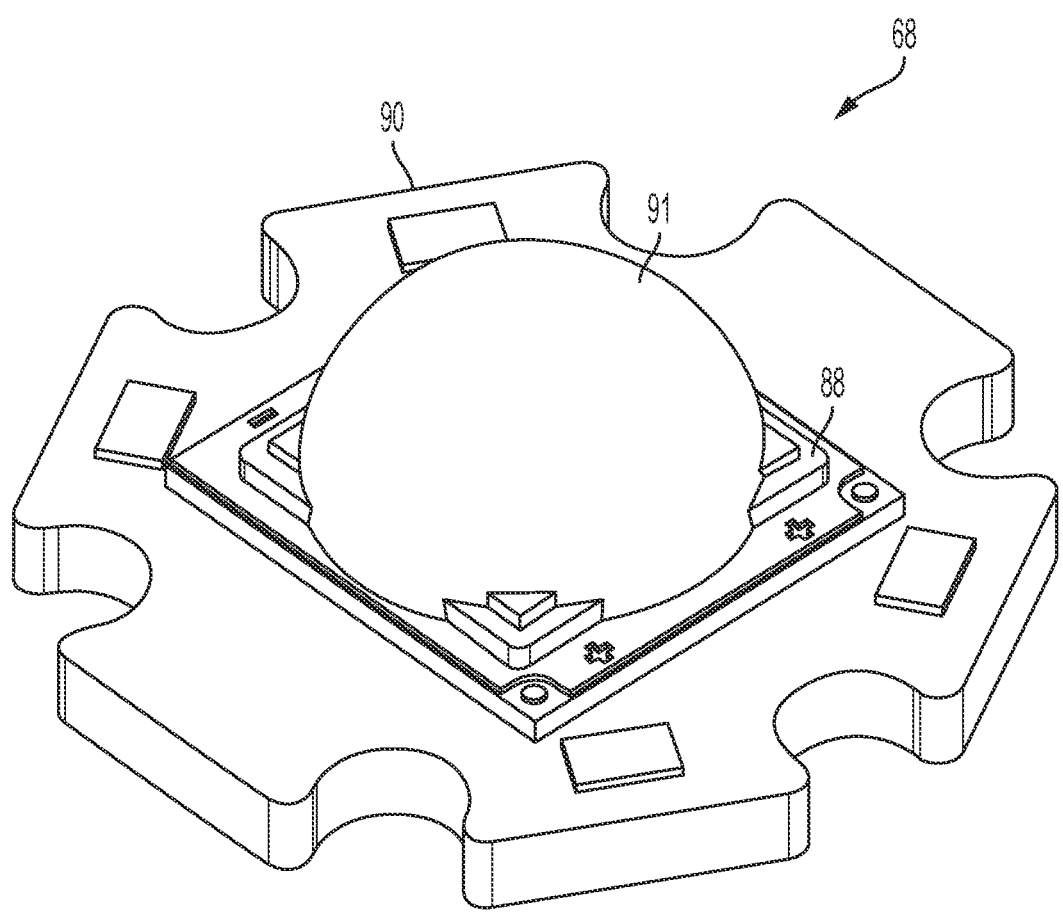
FIG. 8 is a perspective view of the light emitter of the projector assembly of FIG. 7 removed from the projector assembly.

Projector assembly 44 will now be discussed in further detail with reference to FIGS. 7-9. In general, as shown in FIG. 7, projector assembly 44 includes an outer or focus lens 64, an internal lens which in the illustrated embodiment comprises a pair of internal lenses 66a, 66b, and a light projector or emitter 68. Projector assembly 44 additionally includes a housing 70 within which the lens assembly of lenses 64, 66a and 66b are disposed, where in the illustrated embodiment housing 70 comprises first housing member 72 supporting focus lens 64 and second housing member 74 supporting lenses 66a, 66b, with housing members 72, 74 being secured together with a passage extending there through when so assembled. Also included is a mask 76 positioned at lens 66b so as to be in between the internal lens and outer lens. Light emitter 68 is mounted to a base 80 with a spacer 82 being disposed between base 80 and housing member 74. FIG. 7 further discloses a pair of threaded retaining rings 84 disposed at lens 66a and 66b, where the retaining rings 84 included external threads and are used to thread to internal threads of housing 74 to secure the respective lenses 66a, 66b to internal portions of housing 74, where in the illustrated embodiment housing 74 includes an internal SM1 thread. As also shown in FIG. 7, an SM1 to C-Mount threaded adapter 86 is used where the focus lens 64 is configured for engagement with a C-mount threaded hole. Adapter 86 enables the use of standard optics arrangement of lenses 66a, 66b, but it should be appreciated that in an alternative arrangement in which a custom lens configuration of lenses 66a, 66b were provided that fit within a C-mount threaded hole. The distance between mask 76, which is pressed up against lens 66b, and focus lens 64 is a controlled dimension that is established by the internal features of housing member 74, taking into account the spacer effect of adapter 86. Focus lens 64 in the illustrated embodiment comprises a conventional camera focus lens such as may be supplied by CANON or NIKON, which are known to include lens elements, such as lens elements 64a and 64b, and a housing 64c having a threaded end 64d with external C-Mount threads for engaging with the adapter 86. As shown and discussed, the focus lens 64 is used in the projecting of light to focus the light for projecting, such as onto the tire and wheel assembly 26. In one example, a focus lens having a focus length of from 350 mm to 550 mm is used, where when mounted within first housing 72 the focal length of the focus lens is fixed at a nominal 450 mm As illustrated in FIG. 8, light emitter 68 is configured as an LED package that includes an LED semi-conductor 88, which is mounted to a star shaped board 90, with red light emitting LED lights mounted to semi-conductor 88 beneath a dome lens 91. Dome lens 91 disperses the light to create a pyramid shaped projection of light 89 from light emitter 68 that is directed at the flat face of lens 66a of the lens pair 66a, 66b. In the illustrated embodiment lenses 66a, 66b comprise a pair of plano convex hemispherical lenses that are oriented with their curved surfaces directed toward each other. In this arrangement, light projected from light emitter 68 is first directed into lens 66a, with lens 66a collimating the light and directing it into lens 66b, and with lens 66b in turn redirecting the light through mask 76. The light projected through mask 76 then enters and passes through focus lens 64 so as to be directed out of aperture 65 on front panel 51 of housing 42 at the wheel assembly 26. Although not shown, a protective window or lens may be placed in front of aperture 65, such as with an anti-reflective coating, for purposes of protecting the projector assembly 44.

Figure 9:
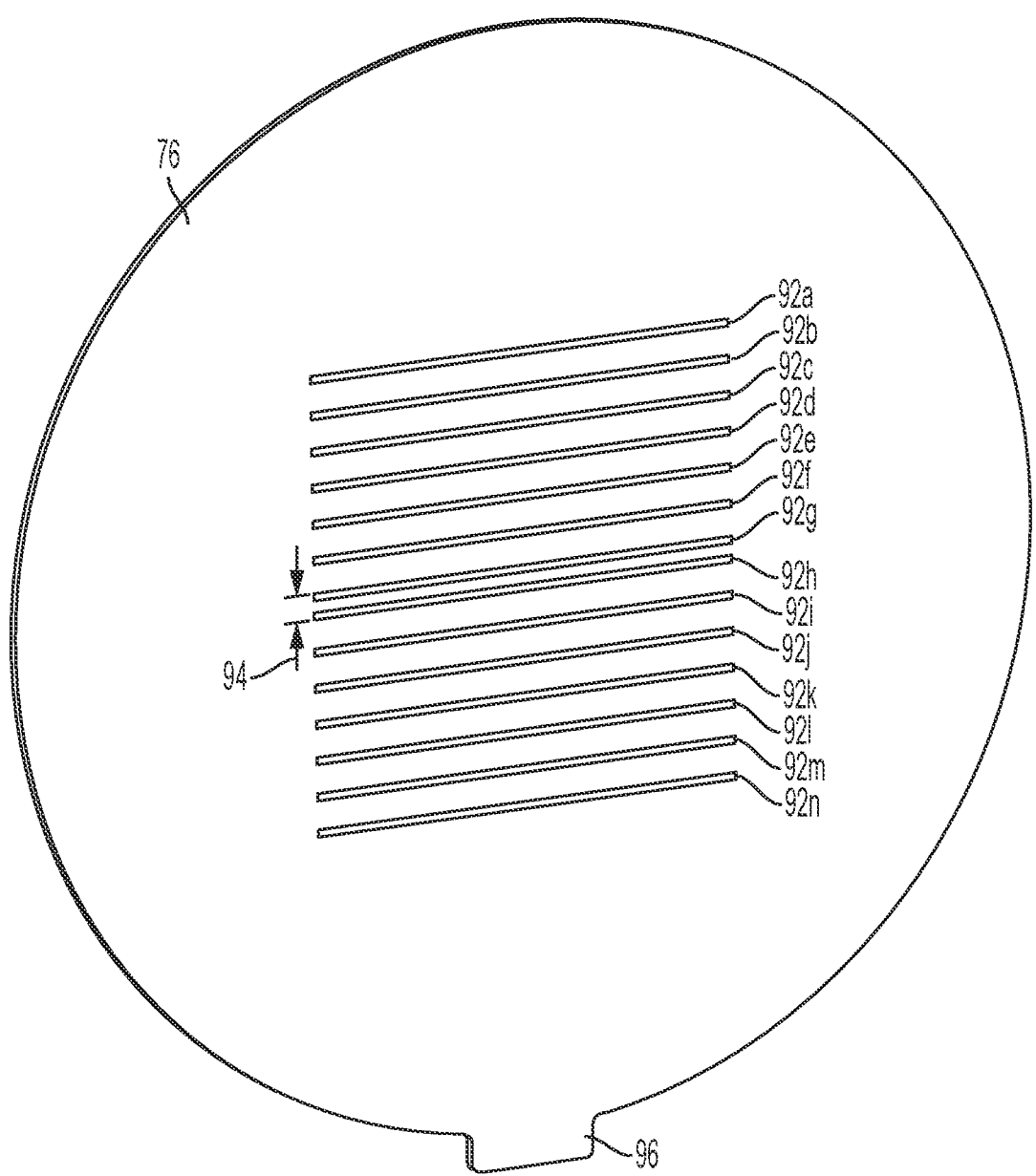
FIG. 9 is a perspective view of the mask of the light projector assembly of the projector assembly of FIG. 7 removed from the projector assembly.

Mask 76 is disclosed in FIG. 9 to include apertures, which in the illustrated embodiment are configured as multiple horizontal and parallel slits 92a-92n, where slits 92a-92n form the corresponding light pattern of projected light planes 28a-28n based on the light projected from light emitter 68 passing through lenses 66a, 66b and, in turn, mask 76. As shown, slits 92g, 92h are disposed in closer proximity to one another so as to form a gap 94 there between that is different than the gaps between the remaining slits 92, with gap 94 thus forming the gap 40 between the projected light planes 28g, 28h. This gap 94 on mask 76 forms the gap 40 between the projected light planes 28 to thereby form the visual identifier of the illumination lines 30 on the tire and wheel assembly 26. It should also be understood that the slits 92a-g are spaced equidistant from each other, as are the slits 92h-n. In the illustrated embodiment, mask 76 is formed from sheet metal, and in particular a thin gauge stainless steel sheet that is laser cut to form the slits 92 and the outer shape of mask 76, including tab 96 that may be used for accurately orienting and positioning mask 76 within housing member 74.

The light planes projected through mask 76 and into focus lens 64 are then fine-tuned for focus of the structured light for the distance from the sensor 22 to the wheel assembly 26. The mounting of lenses 66a, 66b within housing 74 is set to accurately control the distance between mask 76 and focus lens 64 to thereby establish the working distance and depth of field for the sensor 22.

Figure 5:
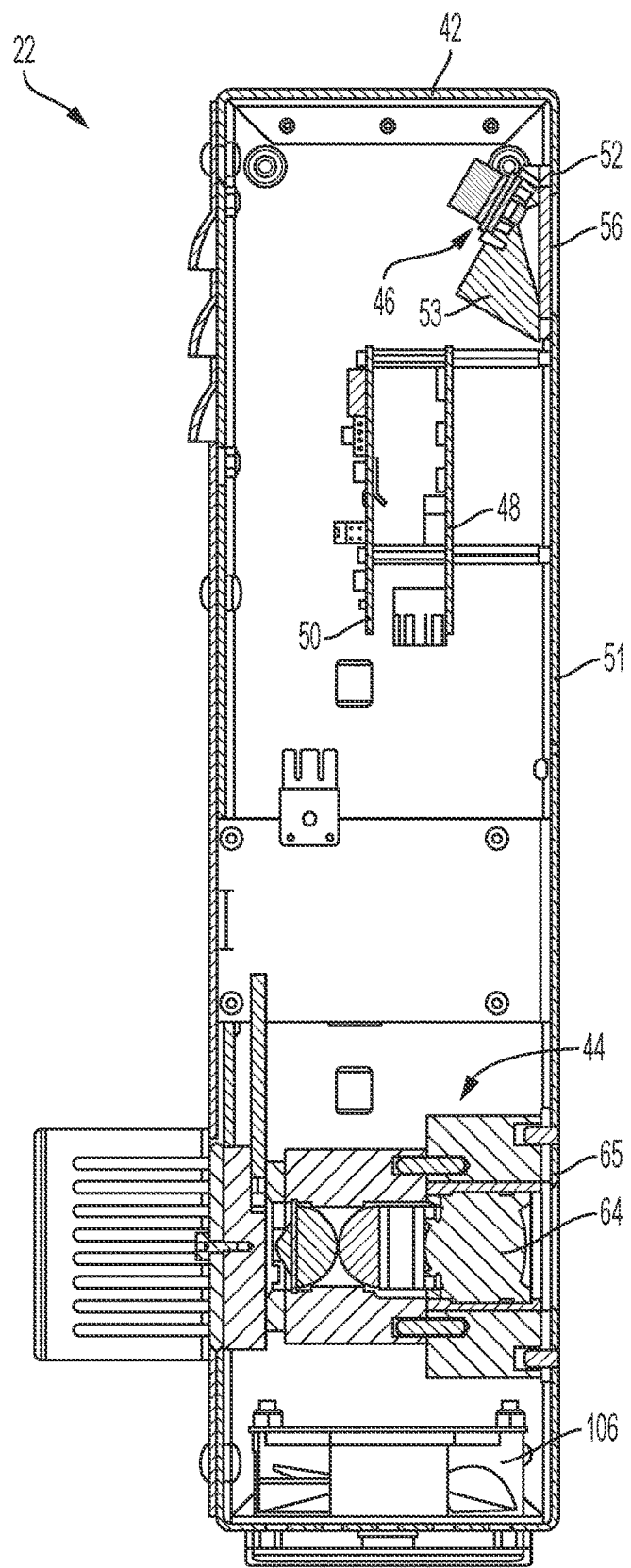
FIG. 5 is a side cross sectional view of the sensor of FIG. 2.
Figure 10:
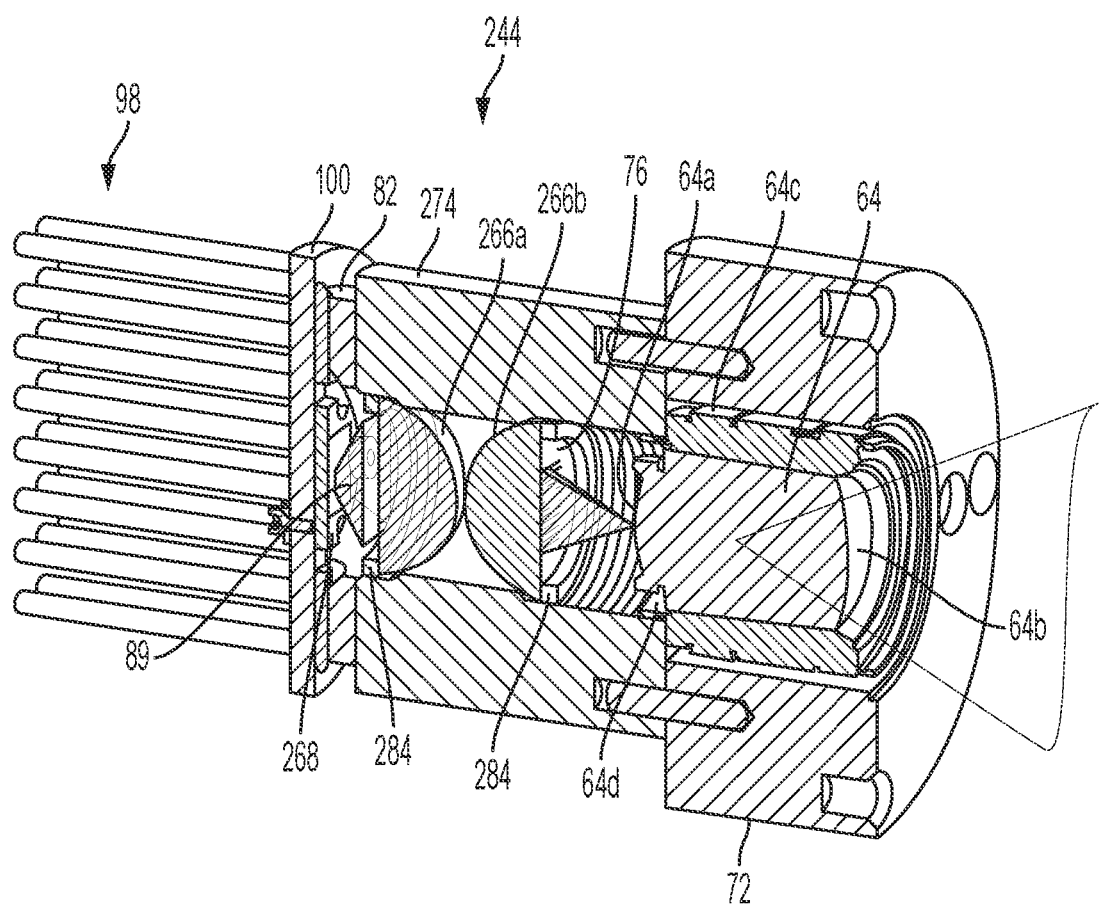
FIG. 10 is a cross sectional perspective view of an alternative projector assembly for the sensor of FIG. 2.

In the embodiment of FIG. 7, board 90 of light emitter 68 is mounted to base 80, with base 80 in turn being joined with a heat sink 98, where heat sink 98 includes a sink base 100 and multiple rods 102 extending therefrom. As shown in FIG. 5, rods 102 extend outwardly from a backside of housing 42. Adjacent to base 80, as shown in FIG. 7, wires 104 for LED semi-conductor 88 extend upward from light emitter 68, such as to circuit board 50 for controlling the activation of light emitter 68. In an alternative configuration, base 80 is omitted whereby board 90 of light emitter is mounted directly to sink base 100 of heat sink 98, which improves the thermal efficiency by improving the heat transfer from board 90. Such an alternative configuration is shown in FIG. 10, which is discussed below. In addition, one or more thermistors are disposed at or adjacent the light emitter 68, where the thermistor is used to aid in regulating or controlling the temperature of the light emitter 68, which is useful because the operating temperature of the light emitter 68 affects the performance, by way of the brightness, and the reliability and useful life of the sensor 22. Sensor 22 further includes a fan 106 within housing 42 for providing cooling to the interior of housing 42. In the illustrated embodiment, sensor 22 utilizes a power-over-Ethernet (POE) construction for power and communication, with circuit board 49 comprising a POE board. As noted, circuit board 50 operates as an LED driver board that also provides power to various components of sensor 22, as well as performs other operations, such as receiving inputs from internal sensors, such as thermistors, as well as outputs power to fan 106. Circuit board 48, in turn, comprises a processor or on board computer.

As noted above, FIG. 10 discloses an alternatively arranged light projector or projector assembly 244 that is of substantially similar construction to projector assembly 44 discussed above, but includes an alternative light emitter 268, omits the base 80 whereby the light emitter 268 is in direct contact with the heat sink 98, and utilizes alternatively sized internal lenses 266a, 266b with a differently sized threaded passage within second housing 274 such that the threaded adapter 86 may be omitted. In particular, the internal passage of second housing 274 is constructed to have C-mount sized internal threads to match focus lens 64, with lenses 266a, 266b having slightly smaller diameters relative to lenses 66a, 66b discussed above, and correspondingly alternatively sized retaining rings 284. As disclosed above regarding projector assembly 44, focus lens 64 includes an end having external threads for engaging with internal C-mount threads of second housing 274.

Figure 11:
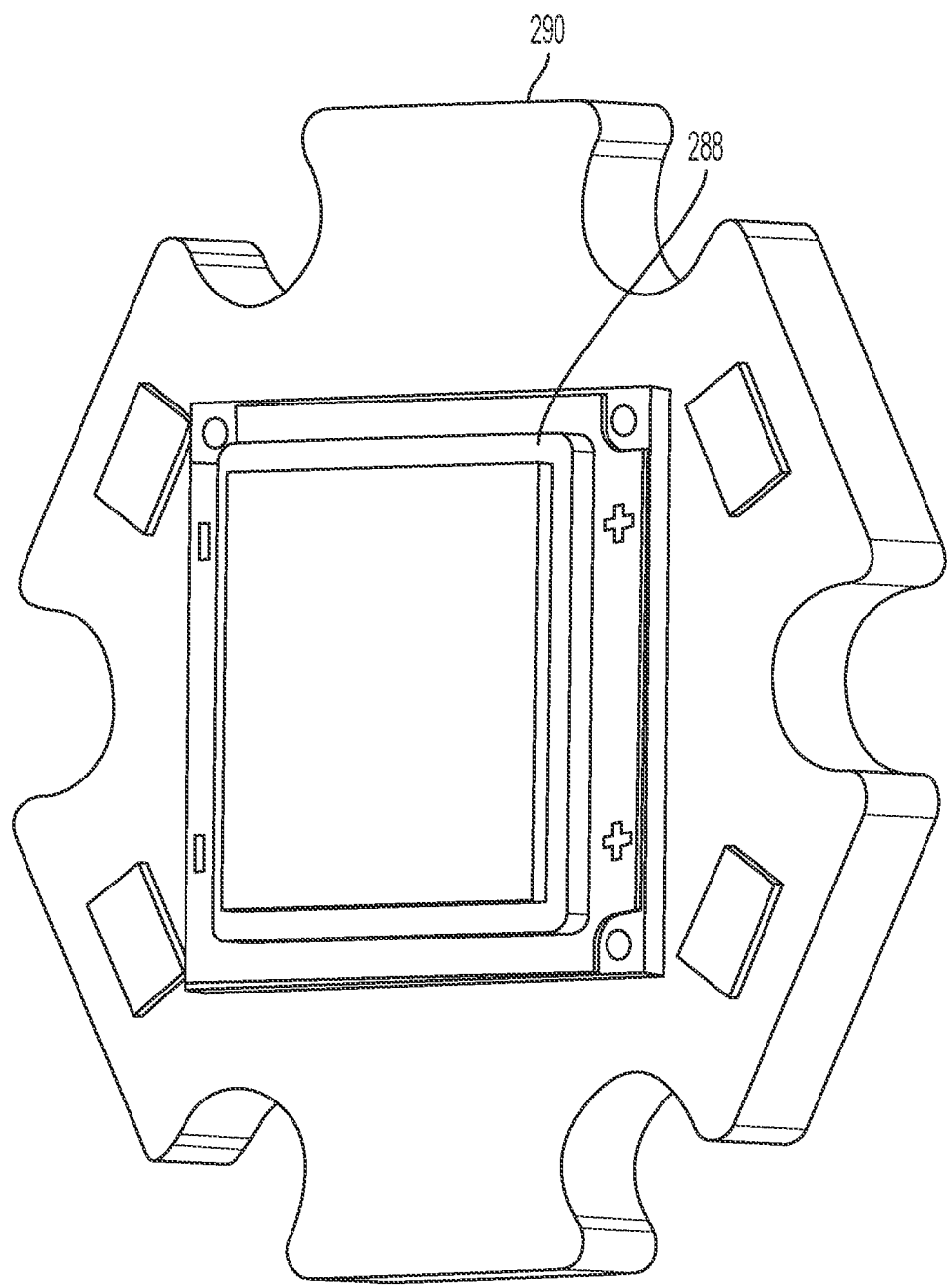
FIG. 11 is a perspective view of an alternative light emitter for use with a projector assembly.

Alternative light emitter 268 is illustrated in FIG. 11 and is there shown to omit dome lens 91. In like manner to light emitter 68 discussed above, light emitter 268 is configured as an LED package that includes an LED semi-conductor 288, which is mounted to a star shaped board 290, with red light emitting LED lights mounted to semi-conductor 288. Light emitters 68 and 268 may be provided by, for example, Luminus Devices, Inc. of Woburn, Mass.

In the illustrated embodiment of FIG. 1, a pair of sensors 22 are disposed at each wheel assembly 26, with each sensor 22 from a given pair projecting illumination lines 30 onto one side of a respective tire 32 and imaging the reflected images of those illumination lines 30. As noted above, each sensor 22 may then operate to determine the high points of each illumination line 30 such that a series of high points for both the left and right portions of the tire 32 are derived. For example, such as by way of processors 63 within each of the pair of sensors 22, where processors 63 receive data from their respective imager assembly 46. Each sensor 22 may then output their respective determinations for further processing, such as to computer 36 having one or more internal computer processors. In particular, a data file may be generated by each of the eight sensors disposed about the vehicle 22, whereby eight data files are generated that are subsequently processed in pairs, where each pair comprises data of a left side and a right side of a given wheel assembly 26 from respective sensors 22 on either side of the wheel assembly 26. From this, and based on the known geometrical arrangement of the sensor 22 and the ability to determine the identification of each of the illumination lines 30 based on gap 40, a trigonometric plane of the orientation of wheel assembly 26 may be derived. Sensor 22 may be configured to analyze the imaged reflections of the illumination lines 30 in particular regions of interest (ROI), such as encompassing the high point for each illumination line 30, but excluding the outer ends of the illumination lines 30 so as to minimize the computational processing. In the illustrated embodiment, the camera circuit board 62 for each sensor sends the raw trigonometrical X, Y, Z line data to the internal computer board for processing to determination of the high points of each imaged illumination line 30. The data from each sensor 22 may in turn be transmitted to computer 36 for processing the given left and right side data for each wheel assembly 26 to determine the wheel alignment characteristics of the wheel assembly 26.

Each sensor 22 may be calibrated relative to test stand 38 to enable the processing of imaged illumination lines 30 to determine the wheel alignment characteristics of the wheel assembly 26. For example, one or more configured masters may positioned on test stand 38 with the masters comprising objects of a known geometry and distance relative to sensors 22. Sensors 22 may then be run through a calibration cycle or cycles based on the known geometry and distance to thereby subsequently enable use of sensors 22 with vehicles 24.

It should be appreciated that sensors 22 may be alternatively constructed while operating in accordance with the present invention. For example, alternative sensors may be configured to project more or less than fourteen light planes. Still further, sensors may be configured to project green light and utilize a green filter, and/or masks of different configuration may be employed. Still further, although in the illustrated embodiment various processors are disclosed, including processors internal to sensor as well as external, such as in computer 36, it should be appreciated that alternative computer computational arrangements may be employed. Including, for example use of one or more centralized processors receiving data from multiple sensors for determination of wheel alignment orientation. Although sensors 22 are discussed above in connection with determining wheel alignment orientation, it should be further appreciated that sensors 22 may be used to determine the orientation and/or alignment of other objects, including for example fender orientation, position and the like. Other changes and modifications in the specifically described embodiments can be carried out without departing from the principles of the present invention which is intended to be limited only by the scope of the appended claims, as interpreted according to the principles of patent law including the doctrine of equivalents.

The embodiments of the invention in which an exclusive property or privilege is claimed are defined as follows:

1. A non-contact sensor for determining orientation of an object, said non- contact sensor comprising:
    a projector assembly, said projector assembly including a light emitter, a lens assembly and a mask, said mask including mask apertures with said light emitter configured to project light through said lens assembly and said mask apertures and onto an object with said mask apertures creating a light pattern of projected light onto the object;
    an imager, said imager configured to image reflections of said light pattern from the object; and
    a processor;
    wherein said projector assembly and said imager are angled with respect to one another, and wherein said processor is configured to process imaged reflections of said light pattern to derive the orientation of the object;
    wherein said lens assembly comprises an internal lens and an outer lens, and wherein said mask is disposed between said internal lens and said outer lens, and wherein said projector assembly comprises a projector housing having a threaded bore within which said internal lens is fixed, and wherein said outer lens comprises a focus lens having a threaded end engaged with said threaded bore.

2. The non-contact sensor of claim 1, wherein said light emitter comprises an LED light emitter.

3. The non-contact sensor of claim 1, wherein said lens assembly comprises a pair of adjacently disposed lenses positioned between said light emitter and said mask.

4. The non-contact sensor of claim 3, wherein said pair of adjacently disposed lenses comprise a first hemispherical lens and a second hemispherical lens.

5. The non-contact sensor of claim 3, wherein said lens assembly further comprises a focus lens, and wherein said focus lens is spaced from said mask whereby light projected through said mask is projected through said focus lens and onto the object.

6. The non-contact sensor of claim 1, wherein said light pattern includes a visual identifier and wherein said visual identifier is operable by said processor to discern the identity and location of said light pattern when projected on the object.

7. The non-contact sensor of claim 6, wherein said visual identifier comprises a gap between a pair of parallel illumination lines generated by said light pattern on the object.

8. The non-contact sensor of claim 1, wherein said mask apertures comprise a plurality of slits whereby said light pattern of projected light forms illumination lines on the object.

9. The non-contact sensor of claim 8, wherein at least two of said slits are spaced closer to each other than other of said slits.

10. The non-contact sensor of claim 1, wherein said processor comprises a plurality of processors, and wherein a first one of said processors is configured to process images of said light pattern reflected from the object, and wherein a second one of said processors is configured to derive the orientation of the object.

11. The non-contact sensor of claim 1, wherein said imager is positioned vertically higher than said projector assembly, and wherein said imager is downwardly oriented to view at a downward angle.

12. The non-contact sensor of claim 1, further comprising a sensor housing, wherein said projector assembly and said imager are mounted within said sensor housing, and wherein said imager is located in a fixed and known position relative to said projector assembly.

13. A non-contact sensor for determining orientation of a tire and wheel assembly of a vehicle, said non-contact sensor comprising:
    a sensor housing, said sensor housing retaining a projector assembly and an imager;
    said projector assembly including a light emitter, a lens assembly and a mask, said mask including mask apertures with said light emitter configured to project light through said lens assembly and said mask apertures and onto the tire and wheel assembly with said mask apertures creating a light pattern of projected light onto the object;
    said imager configured to image reflections of said light pattern from the tire and wheel assembly;
    wherein said projector assembly and said imager are angled with respect to one another when retained by said sensor housing whereby said imager images reflections of said light pattern at an angle relative to the projection of said light pattern, and wherein a processor is configured to process imaged reflections of said light pattern to derive the orientation of the object;
    wherein said lens assembly comprises an internal lens and an outer lens, and wherein said mask is disposed between said internal lens and said outer lens, and wherein said projector assembly comprises a projector housing having a threaded bore within which said internal lens is fixed, and wherein said outer lens comprises a focus lens having a threaded end engaged with said threaded bore.

14. The non-contact sensor of claim 13, wherein said light emitter comprises an LED light emitter.

15. The non-contact sensor of claim 13, wherein said lens assembly comprises a pair of adjacently disposed lenses positioned between said light emitter and said mask, wherein light is projected by said light emitter at a first one of said pair of lenses and passes through said first one of said pair of lenses and through a second one of said pair of lenses, and wherein light passing through said second one of said pair of lenses passes through said mask.

16. The non-contact sensor of claim 15, wherein said lens assembly further comprises a focus lens, and wherein said focus lens is spaced from said mask whereby light projected through said mask is projected through said focus lens and onto the tire and wheel assembly.

17. The non-contact sensor of claim 13, wherein said light pattern includes a visual identifier and wherein said visual identifier is operable by said processor to discern the identity and location of said light pattern when projected on the tire and wheel assembly.

18. A non-contact sensor system for determining orientation of a tire and wheel assembly of a vehicle, said non-contact sensor system comprising:
    a pair of non-contact sensors with one of said non-contact sensors positioned on either side of a tire and wheel assembly of a vehicle, and wherein each said non-contact sensor comprises;
    a projector assembly, said projector assembly including a light emitter, a lens assembly and a mask, said mask including mask apertures with said light emitter configured to project light through said lens assembly and said mask apertures and onto a portion of the tire and wheel assembly with said mask apertures creating a light pattern of projected light onto the portion of the tire and wheel assembly, wherein said lens assembly comprises an internal lens and an outer lens, and wherein said mask is disposed between said internal lens and said outer lens, and wherein said projector assembly comprises a projector housing having a threaded bore within which said internal lens is fixed, and wherein said outer lens comprises a focus lens having a threaded end engaged with said threaded bore;
    an imager, said imager configured to image reflections of said light pattern from the portion of the tire and wheel assembly; and
    a sensor processor;
    wherein said projector assembly and said imager are angled with respect to one another, and wherein said sensor processor is configured to process imaged reflections of said light pattern to derive geometric orientation information of the portion of the tire and wheel assembly;
    said non-contact sensor system further comprising a central processor, and wherein said central processor receives the geometric orientation information from both said non-contact sensors, with said central processor configured to derive the orientation of the tire and wheel assembly.

19. The non-contact sensor system of claim 18, wherein said system further comprises at least one more pair of said non-contact wheel sensors positioned on either side of at least another tire and wheel assembly of the vehicle.

20. The non-contact sensor system of claim 19, wherein said system comprises four pairs of said non-contact wheel sensors positioned on either side of all four tire and wheel assemblies of the vehicle.

* * * * *